(12) United States Patent　　　(10) Patent No.: US 12,695,859 B2
　　　Oka　　　　　　　　　　　　　　　(45) Date of Patent: Jul. 28, 2026

(54) IMAGE PROCESSING DEVICE, MOVING APPARATUS, IMAGE PROCESSING METHOD, AND STORAGE MEDIUM

(71) Applicant: CANON KABUSHIKI KAISHA, Tokyo (JP)

(72) Inventor: Nobuhiro Oka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 141 days.

(21) Appl. No.: 18/312,618

(22) Filed: May 5, 2023

(65) Prior Publication Data

US 2023/0379445 A1　　Nov. 23, 2023

(30) Foreign Application Priority Data

May 23, 2022　(JP) ................................. 2022-083849

(51) Int. Cl.
　　*H04N 13/275* 　　(2018.01)
　　*G06T 7/593* 　　(2017.01)
　　　　　(Continued)
(52) U.S. Cl.
　　CPC ........... *H04N 13/275* (2018.05); *G06T 7/593* (2017.01); *G06T 15/04* (2013.01); *G06T 15/10* (2013.01); *G06T 17/00* (2013.01); *H04N 13/243* (2018.05)
(58) Field of Classification Search
　　CPC .. H04N 13/275; H04N 13/243; H04N 13/111; H04N 13/239; H04N 2013/0081;
　　　　　(Continued)

(56) References Cited

U.S. PATENT DOCUMENTS 7,307,655 B1　12/2007　Okamoto et al.
2013/0162763 A1*　6/2013　Cheng ..................... G06T 7/593
　　　　　　　　　　　　　　　　　　　　　　348/42
(Continued)

FOREIGN PATENT DOCUMENTS

JP　　　　　3286306 B2　　3/2002
JP　　2015045920 A　 *　3/2015
(Continued)

OTHER PUBLICATIONS

Wang et al.: Depth estimation for speckle projection system using progressive reliable points growing matching [online] [Retrieved Apr. 27, 2026] <URL: https://image.ee.tsinghua.edu.cn/pdf/ao-52-3-516.pdf> (Year: 2013).*

(Continued)

*Primary Examiner* — King Y Poon
*Assistant Examiner* — Vincent Alexander Providence
(74) *Attorney, Agent, or Firm* — Carter, DeLuca & Farrell LLP

(57)　　　　　　ABSTRACT

An image processing device includes a plurality of imaging units each configured to include an optical system and an imaging element that generates a first image signal and a second image signal having a predetermined parallax from an optical image incident through the optical system, a development unit configured to generate a plurality of pieces of image data based on outputs of the plurality of imaging units, a distance data generation unit configured to generate distance data for each pixel of the plurality of pieces of image data based on the first image signal and the second image signal respectively generated by the plurality of imaging units, and a video generation unit configured to generate a virtual viewpoint video viewed from a predetermined virtual viewpoint based on the plurality of pieces of
(Continued)

image data and the distance data for each pixel of the plurality of pieces of image data.

9 Claims, 9 Drawing Sheets

(51) Int. Cl.
| | |
|---|---|
| *G06T 15/04* | (2011.01) |
| *G06T 15/10* | (2011.01) |
| *G06T 17/00* | (2006.01) |
| *H04N 13/243* | (2018.01) |

(58) Field of Classification Search
CPC ......... G06T 7/593; G06T 15/04; G06T 15/10; G06T 17/00; G06T 15/20
See application file for complete search history.

(56) References Cited

U.S. PATENT DOCUMENTS

| | | | | |
|---|---|---|---|---|
| 2013/0215107 A1* | 8/2013 | Kimura | ................... | G06T 15/00 |
| | | | | 345/419 |
| 2014/0049612 A1* | 2/2014 | Ishii | ..................... | H04N 13/271 |
| | | | | 348/46 |
| 2015/0049917 A1* | 2/2015 | Ciurea | ................... | H04N 23/16 |
| | | | | 382/106 |
| 2015/0125093 A1* | 5/2015 | Jeong | ........................ | G06T 5/77 |
| | | | | 382/284 |
| 2015/0145861 A1* | 5/2015 | Tytgat | ..................... | G06T 17/00 |
| | | | | 345/420 |
| 2017/0148168 A1* | 5/2017 | Lindner | .................. | G06T 7/593 |
| 2017/0208271 A1* | 7/2017 | Hasegawa | .............. | H04N 25/61 |
| 2020/0288102 A1* | 9/2020 | Um | ......................... | G06T 15/10 |

FOREIGN PATENT DOCUMENTS

| | | | | |
|---|---|---|---|---|
| JP | 2021127998 A | 9/2021 | | |
| JP | 2021179800 A | 11/2021 | | |
| WO | WO-2013054499 A1 * | 4/2013 | ............ | G01B 11/00 |
| WO | 2019049709 A1 | 3/2019 | | |
| WO | WO-2021060539 A1 * | 4/2021 | ............ | G01B 11/22 |

OTHER PUBLICATIONS

Notice of Reasons for Refusal issued by the Japanese Patent Office on Mar. 31, 2026 in corresponding JP Patent Application No. 2022-083849, with English translation.

* cited by examiner

FIG. 2

GREEN
PIXEL
G1

RED
PIXEL
R

102

I          I'

312
SECOND
PHOTOELECTRIC
CONVERSION UNIT

311
FIRST
PHOTOELECTRIC
CONVERSION UNIT

B
BLUE
PIXEL

G2
GREEN
PIXEL

310
PIXEL GROUP

GREEN
PIXEL
G1

RED
PIXEL
R

313
MICROLENS

314
LIGHT GUIDE LAYER

315
LIGHT RECEIVING LAYER

312
SECOND PHOTOELECTRIC
CONVERSION UNIT

311
FIRST PHOTOELECTRIC
CONVERSION UNIT

FIG. 4A

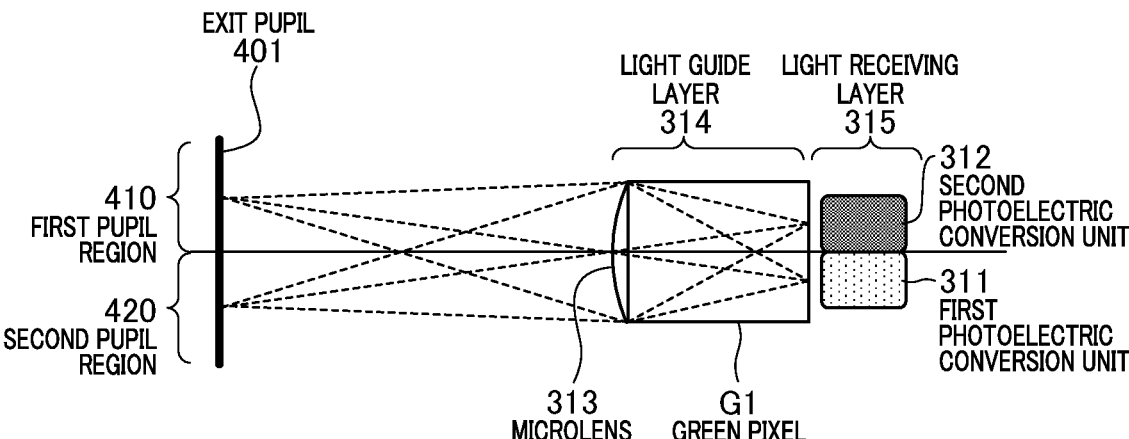

EXIT PUPIL
401

LIGHT GUIDE LAYER 314

LIGHT RECEIVING LAYER 315

410 FIRST PUPIL REGION

420 SECOND PUPIL REGION

312 SECOND PHOTOELECTRIC CONVERSION UNIT

311 FIRST PHOTOELECTRIC CONVERSION UNIT

313 MICROLENS       G1 GREEN PIXEL

FIG. 4B

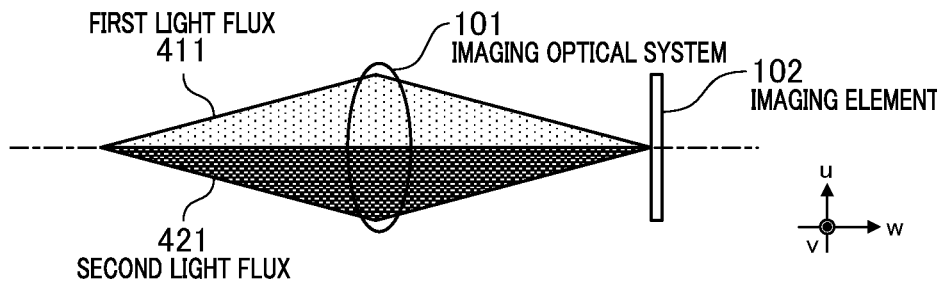

FIRST LIGHT FLUX 411

101 IMAGING OPTICAL SYSTEM

102 IMAGING ELEMENT

421 SECOND LIGHT FLUX

FIG. 4C

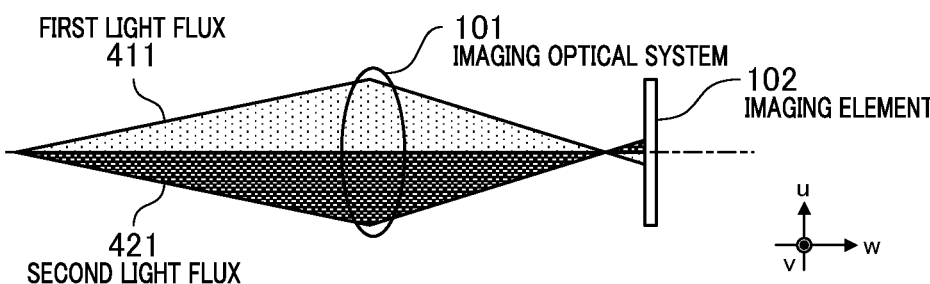

FIRST LIGHT FLUX 411

101 IMAGING OPTICAL SYSTEM

102 IMAGING ELEMENT

421 SECOND LIGHT FLUX

FIG. 4D

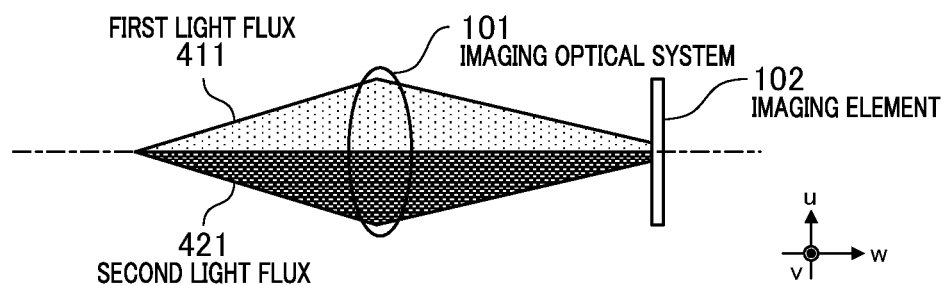

FIRST LIGHT FLUX 411

101 IMAGING OPTICAL SYSTEM

102 IMAGING ELEMENT

421 SECOND LIGHT FLUX

ORIGIN OF WORLD
COORDINATE SYSTEM
IS CENTER OF
VEHICLE 100

IMAGE PROCESSING DEVICE, MOVING APPARATUS, IMAGE PROCESSING METHOD, AND STORAGE MEDIUM

BACKGROUND OF THE INVENTION

Field of the Invention

The present invention relates to an image processing device capable of generating an image using distance data, a moving apparatus, an image processing method, a storage medium, and the like.

Description of the Related Art

A technique for converting a video captured by a camera into a video viewed from an arbitrary viewpoint (hereinafter referred to as a virtual viewpoint) different from an imaging direction of the camera is known. Using this technique, videos obtained by converting a video captured by a plurality of cameras installed on a vehicle into images viewed from a virtual viewpoint near the vehicle (hereafter referred to as virtual viewpoint videos) are used for purposes such as support of driving and parking of the vehicle.

Japanese Patent No. 3286306 discloses the following technique regarding such a virtual viewpoint video creation technique. First, a 3D model is generated by combining a plane model and a curved surface model as a space model representing the surrounding environment of a vehicle, and space data is generated by mapping a captured image on the space model. Next, a virtual viewpoint video is created by generating an image viewed from an arbitrary viewpoint with reference to the space data.

Japanese Patent No. 3286306 discloses a technique for creating a virtual viewpoint video with reduced distortion of obstacles by generating a plane perpendicular to a road surface as a space model in accordance with the position of a three-dimensional object within a predetermined distance from a vehicle.

However, the technique disclosed in Japanese Patent No. 3286306 has a problem that a three-dimensional object near a vehicle remains distorted or tilted in a virtual viewpoint video due to a difference between a set space model and the shape of the three-dimensional object.

SUMMARY OF THE INVENTION

An image processing device according to one aspect of the present disclosure includes a plurality of imaging units each configured to include an optical system and an imaging element that generates a first image signal and a second image signal having a predetermined parallax from an optical image incident through the optical system, at least one processor or circuit configured to function as; a development unit configured to generate a plurality of pieces of image data based on outputs of the plurality of imaging units, a distance data generation unit configured to generate distance data for each pixel of the plurality of pieces of image data based on the first image signal and the second image signal generated by each of the plurality of imaging units, and a video generation unit configured to generate a virtual viewpoint video viewed from predetermined virtual viewpoints based on the plurality of pieces of image data and the distance data for each pixel of the plurality of pieces of image data.

Further features of the present invention will become apparent from the following description of embodiments with reference to the attached drawings.

BRIEF DESCRIPTION OF THE DRAWINGS

FIG. 2 is a functional block diagram illustrating a configuration of a virtual viewpoint video generation device according to the embodiment.

FIGS. 4A to 4D are schematic diagrams illustrating a relationship between a subject distance and incident light in an imaging plane phase difference method.

DESCRIPTION OF THE EMBODIMENTS

Hereinafter, with reference to the accompanying drawings, favorable modes of the present invention will be described using embodiments. In each diagram, the same reference signs are applied to the same members or elements, and duplicate description will be omitted or simplified.

Figure 1:
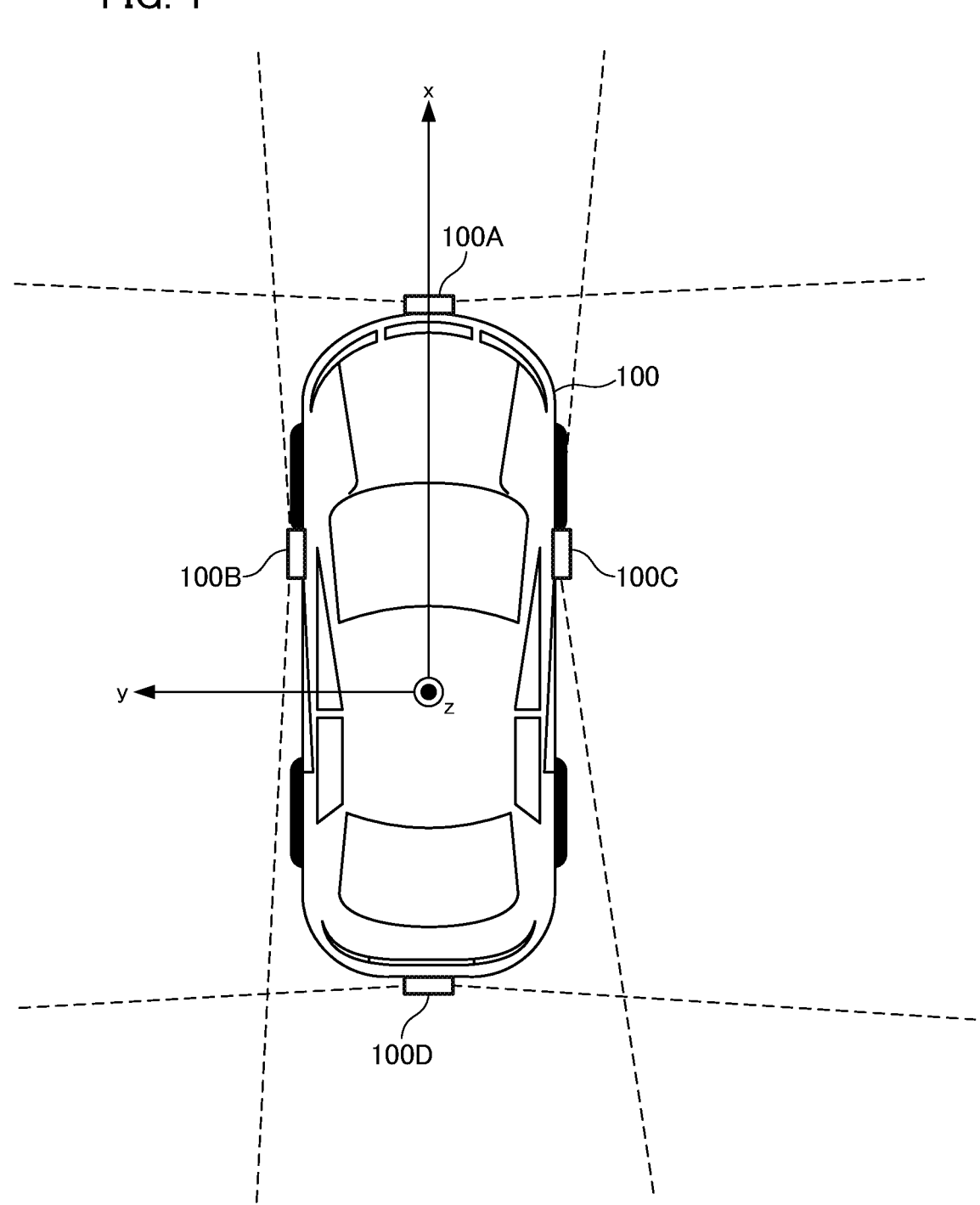
FIG. 1 is a diagram illustrating a positional relationship between an imaging unit and a vehicle according to an embodiment of the present invention.

FIG. 1 is a diagram illustrating a positional relationship between an imaging unit and a vehicle according to an embodiment of the present invention. In the present embodiment, as illustrated in FIG. 1, imaging units 100A to 100D are installed separately from each other on the front, left, rear, and right sides of a vehicle 100, which is a moving apparatus, and capture images of the surroundings of the vehicle 100.

An optical system of the imaging units 100A to 100D in the present embodiment is assumed to include a fisheye lens or a wide-angle lens capable of imaging the surroundings widely, and an angle of view (imaging range) of each of the imaging units 100A to 100D is indicated by a dashed line in FIG. 1.

Note that, although the four imaging units 100A to 100D are provided in the present embodiment as described above, they need only be plural. Note that configurations of the imaging units 100A to 100D will be described later.

Figure 2:
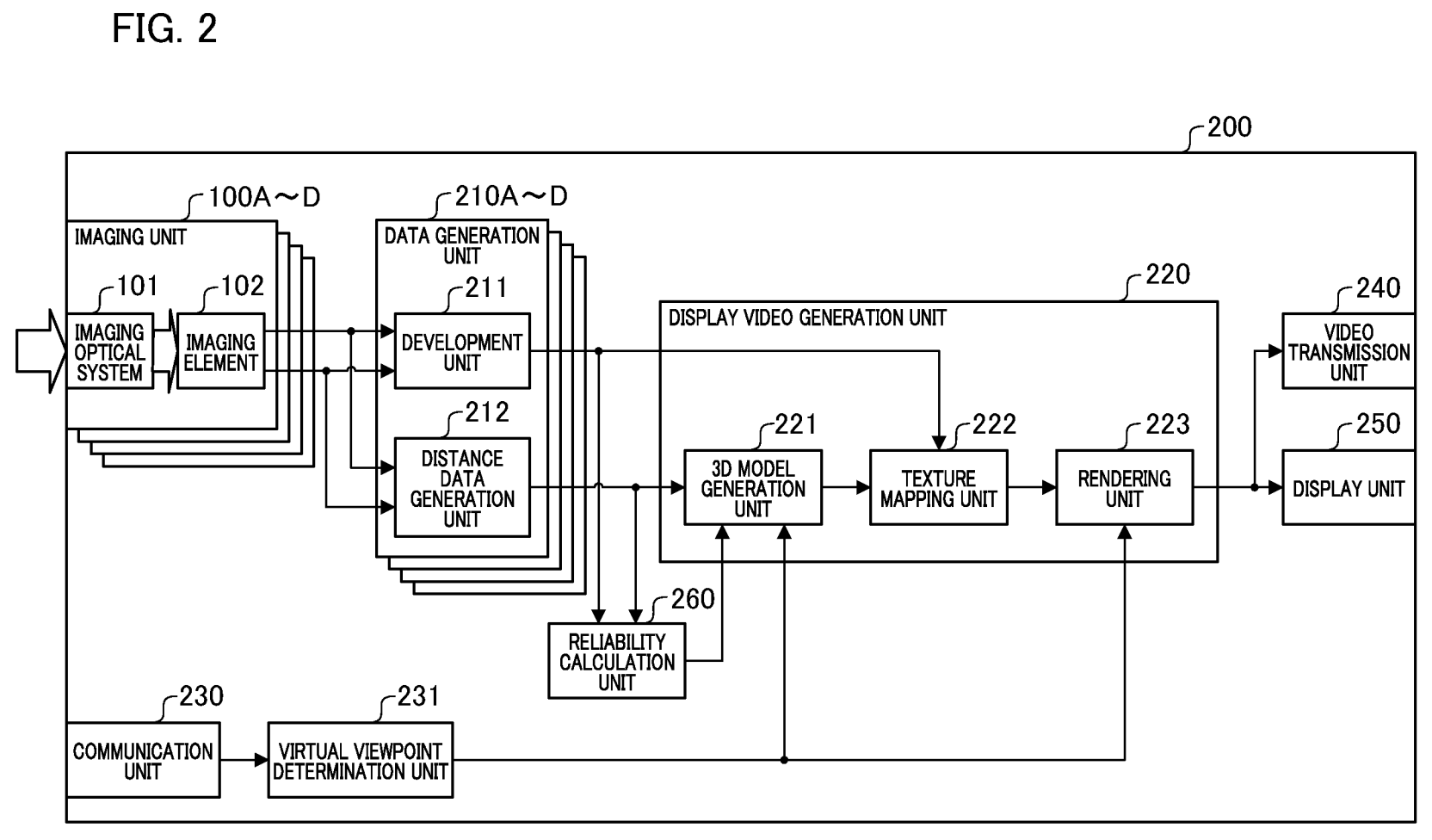

Next, a configuration of a virtual viewpoint video generation device 200 as an image processing device according to the present embodiment will be described using FIG. 2. FIG. 2 is a functional block diagram illustrating a configuration of the virtual viewpoint video generation device according to the embodiment.

Some of the functional blocks illustrated in FIG. 2 are realized by causing a computer, which is not illustrated in the drawing, included in the virtual viewpoint video generation device 200 to execute a computer program stored in a memory as a storage medium which is not illustrated in the drawing. However, some or all may be realized by hardware. As hardware, a dedicated circuit (ASIC), a processor (reconfigurable processor, DSP), or the like can be used.

In addition, the functional blocks illustrated in FIG. 2 may not be built in the same housing, and may be configured by separate devices connected to each other via signal paths. Note that, although the imaging units 100A to 100D have the same configuration in the present embodiment, they may not have the same configuration.

Each of the imaging units 100A to 100D includes an imaging optical system 101 and an imaging element 102. The imaging optical system 101 can form an image (optical image) of a subject on the imaging element 102 and has an exit pupil at a position a predetermined distance away from the imaging element 102.

The imaging element 102 is, for example, a CMOS image sensor, and has a pixel region in which pixels having a photoelectric conversion function are two-dimensionally disposed. Each pixel region has two photoelectric conversion units (a first photoelectric conversion unit and a second photoelectric conversion unit), which photoelectrically convert a subject image formed on the imaging element 102 to generate an image signal based on the subject image.

The imaging elements 102 of the imaging units 100A to 100D convert a first image signal based on a signal output from the first photoelectric conversion unit and a second image signal based on a signal output from the second photoelectric conversion unit to data generation units 210A to 200D, respectively.

In this manner, each of the imaging units 100A to 100D includes an optical system and an imaging element that generates a first image signal and a second image signal having a predetermined parallax from an optical image incident through the optical system. Note that, although the configurations of the data generation units 210A to 200D are assumed to be the same in the present embodiment, they do not have to be the same.

Since the imaging element 102 is configured to output the first image signal and the second image signal as described above, the virtual viewpoint video generation device 200 in the present embodiment can measure the surrounding environment of a vehicle 100 using an imaging plane phase difference method to be described later.

Each of the data generation units 210A to 210D includes a development unit 211 that generates image data including red, green, and blue color signals and a luminance signal for each pixel based on the first image signal and the second image signal. In this manner, the development unit 211 generates a plurality of pieces of image data based on outputs of the plurality of imaging units.

In addition, each of the data generation units 210A to 210D includes a distance data generation unit 212 that generates distance data indicating distance information for each pixel. The distance data generation unit 212 generates distance data for each pixel of the plurality of pieces of image data based on the first image signal and the second image signal generated by each of the plurality of imaging units.

Since the image data and the distance data are generated from the same image signal, the image data and the distance data are obtained at the same timing. That is, they are synchronized with each other. The data generation unit 210 transmits the image data and the distance data to a display video generation unit 220 and a reliability calculation unit 260.

Note that the same number of data generation units 210A to 210D as the imaging units 100A to 100D (four in this example) are provided. The data generation units 210A to 210D generate a plurality of pieces of image data and a plurality of pieces of distance data corresponding to the imaging units 100A to 100D based on the image signals of the imaging units 100A to 100D, respectively, and output the generated data to the display video generation unit 220 and the reliability calculation unit 260. However, for the sake of simplicity, FIG. 2 illustrates only wirings between the imaging unit 100A and the data generation unit 210A.

Note that the data generation units 210A to 210D may be provided in the imaging units 100A to 100D, respectively, and the configuration of the virtual viewpoint video generation device 200 is not limited to that described in the present embodiment.

The display video generation unit 220 generates a virtual viewpoint video viewed from a virtual viewpoint which is an arbitrary viewpoint position by using the plurality of pieces of image data and the plurality of pieces of distance data received from the data generation units 210A to 210D. The display video generation unit 220 in the present embodiment is constituted by a 3D model generation unit 221, a texture mapping unit 222, a rendering unit 223, and the like.

The 3D model generation unit 221 generates a 3D model based on distance data. The texture mapping unit 222 generates a textured 3D model by mapping image data onto the 3D model.

The rendering unit 223 creates a virtual viewpoint video of the surroundings of a moving apparatus by generating a virtual viewpoint image, which is an image of the textured 3D model viewed from a virtual viewpoint which is an arbitrary viewpoint position. Details of operations of the 3D model generation unit 221, the texture mapping unit 222, and the rendering unit 223 will be described later.

Note that the virtual viewpoint is determined based on information regarding a virtual viewpoint determined by a virtual viewpoint determination unit 231 (hereinafter referred to as virtual viewpoint information). Details of the virtual viewpoint information will be described later. The display video generation unit 220 generates a virtual viewpoint video viewed from a predetermined virtual viewpoint based on a plurality of pieces of image data and distance data for each pixel of the plurality of pieces of image data. The virtual viewpoint video generated by the display video generation unit 220 is transmitted to a video transmission unit 240 and a display unit 250.

The video transmission unit 240 is constituted by, for example, a wireless communication unit, and has a function of transmitting the virtual viewpoint video to the outside of the vehicle 100. The outside of the vehicle 100 is, for example, a remote control room for the vehicle 100, or the like, and an operator in the remote control room can perform remote control while viewing the virtual viewpoint video.

The display unit 250 in the present embodiment is constituted by, for example, a liquid crystal display, and displays the virtual viewpoint video received from the display video generation unit 220 for occupants of the vehicle 100 as a moving apparatus. A communication unit 230 has a function of receiving information for generating virtual viewpoint information from the outside such as a remote control room.

The virtual viewpoint determination unit 231 generates virtual viewpoint information based on information received from the communication unit 230. The information received from the communication unit 230 may be information received from the outside such as a remote control room as described above, or may be, for example, information for giving an instruction for a viewpoint generated by a vehicle occupant operating an operation unit which is not illustrated in the drawing. Alternatively, it may be associated with control information of the vehicle, or may be, for example, viewpoint information regarding a direction in which the vehicle's turn signal is turned on.

The reliability calculation unit 260 calculates the reliability of distance data generated by the distance data generation unit 212. A method of calculating the reliability will be described later. The above is the configuration of the virtual viewpoint video generation device 200 according to the present embodiment.

Note that, although the virtual viewpoint video generation device 200 of the present embodiment is mounted on the vehicle 100, a portion of the virtual viewpoint video generation device 200 may be mounted in an external device separate from the vehicle 100. For example, some or all of the data generation unit 210, the display video generation unit 220, the virtual viewpoint determination unit 231, the display unit 250, the reliability calculation unit 260, and the like may be mounted in an external device.

Figure 3A:
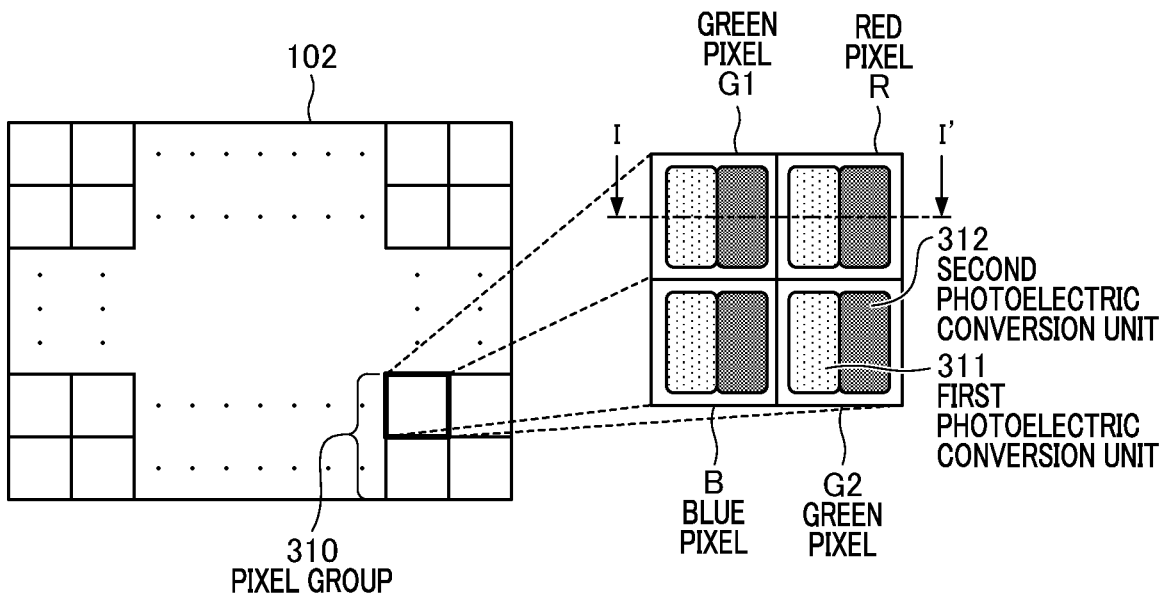
FIGS. 3A and 3B are schematic diagrams illustrating a configuration of an imaging element 102 according to the embodiment.
Figure 3B:
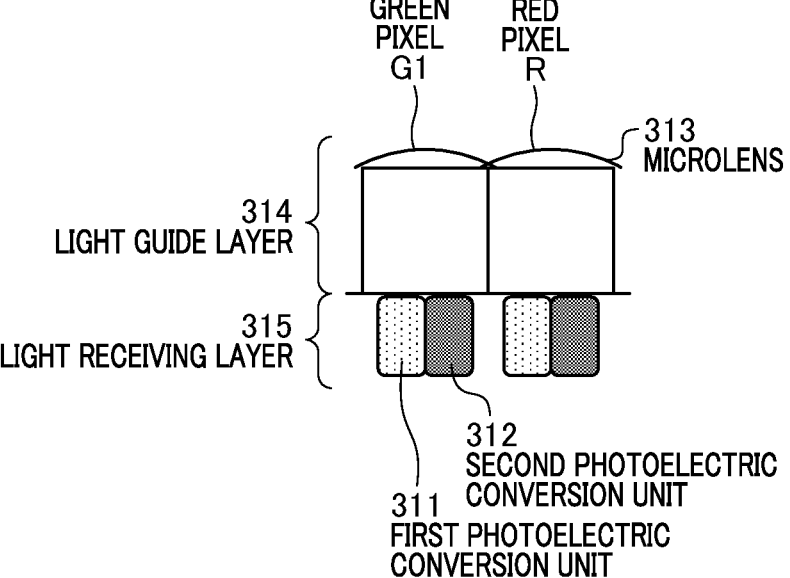

Next, a ranging principle using an imaging plane phase difference method (imaging plane phase difference ranging method or image plane phase difference detection method) using the imaging element 102 will be described with reference to FIGS. 3A and 3B, and FIGS. 4A to 4D. FIGS. 3A and 3B are schematic diagrams illustrating a configuration of the imaging element 102 according to the embodiment, and FIG. 3A is a top view of the imaging element 102 in a light incidence direction.

The imaging element 102 is configured by arranging a plurality of pixel groups 310 of 2 rows by 2 columns in a matrix. The pixel group 310 has green pixels G1 and G2 that detect green light, a red pixel R that detects red light, and a blue pixel B that detects blue light. In the pixel group 310, the green pixel G1 and the green pixel G2 are disposed diagonally. In addition, each pixel includes a first photoelectric conversion unit 311 and a second photoelectric conversion unit 312.

FIG. 3B is a cross-sectional view of the pixel group 310 along line I-I' in FIG. 3A. Each pixel is constituted by a light guide layer 314, a light receiving layer 315, and the like. The light guide layer 314 is a light guide member including a microlens 313, a color filter that transmits light in a wavelength band corresponding to the color of light detected by each pixel, wirings for image reading and pixel driving, and the like in order to efficiently guide a light flux incident on a pixel to the light receiving layer 315.

The light receiving layer 315 is a photoelectric conversion unit that photoelectrically converts light incident through the light guide layer 314 and outputs it as an electrical signal. The light receiving layer 315 includes a first photoelectric conversion unit 311 and a second photoelectric conversion unit 312 disposed side by side in a horizontal line direction of the imaging element.

FIGS. 4A to 4D are schematic diagrams illustrating a relationship between a subject distance and incident light in an imaging plane phase difference method. FIG. 4A is a schematic diagram illustrating light incident on an exit pupil 401 of the imaging optical system 101, the green pixel G1 of the imaging element 102, and the first photoelectric conversion unit 311 and the second photoelectric conversion unit 312 of the green pixel G1. The imaging element 102 has a plurality of pixels, but for the sake of simplicity, one green pixel G1 will be described.

The microlens 313 of the green pixel G1 is disposed such that the exit pupil 401 and the light receiving layer 315 are in an optically conjugate relationship. As a result, a light flux that has passed through a first pupil region 410, which is a partial pupil region within the exit pupil 401, is incident on the first photoelectric conversion unit 311. Similarly, a light flux that has passed through a second pupil region 420, which is a partial pupil region, is incident on the second photoelectric conversion unit 312.

The first photoelectric conversion unit 311 of each pixel photoelectrically converts the received light flux and outputs a signal. A first image signal is generated from the signals output from the plurality of first photoelectric conversion units 311 included in the imaging element 102. The first image signal indicates an intensity distribution of an image formed on the imaging element 102 by the light flux that has mainly passed through the first pupil region 410.

Similarly, the second photoelectric conversion unit 312 of each pixel photoelectrically converts the received light flux and outputs a signal. A second image signal is generated from the signals output from the plurality of second photoelectric conversion units 312 included in the imaging element 102. The second image signal indicates an intensity distribution of an image formed on the imaging element 102 by the light flux that has mainly passed through the second pupil region 420.

The amount of relative positional deviation (hereinafter referred to as a parallax amount) between the first image signal and the second image signal is an amount corresponding to a defocus amount. A relationship between a parallax amount and a defocus amount will be described with reference to FIGS. 4B, 4C, and 4D.

FIGS. 4B, 4C, and 4D are schematic diagrams illustrating a relative positional relationship between the imaging element 102 and the imaging optical system 101. Reference numeral 411 in the drawing denotes a first light flux passing through the first pupil region 410, and reference numeral 421 denotes a light flux passing through the second pupil region 420.

FIG. 4B illustrates a state at the time of focusing, in which the first light flux 411 and the second light flux 421 converge on the imaging element 102. At this time, a parallax amount between a first image signal formed by the first light flux 411 and a second image signal formed by the second light flux 421 is zero.

FIG. 4C illustrates a state where defocusing is performed on an image side in a negative direction of a w axis. At this time, a parallax amount between a first image signal formed by the first light flux 411 and a second image signal formed by the second light flux 421 is not zero and has a negative value.

FIG. 4D illustrates a state where defocusing is performed on an image side in a positive direction of a w axis. At this time, a parallax amount between a first image signal formed by the first light flux 411 and a second image signal formed by the second light flux 421 is not zero and has a positive value.

From comparison between FIGS. 4C and 4D, it can be understood that a direction in which parallax occurs changes depending on whether a defocus amount is positive or negative. In addition, from a geometrical relationship, it can be understood that a parallax amount is generated in accordance with the defocus amount.

Thus, as will be described later, a parallax amount between the first image signal and the second image signal is detected by a region-based matching method, and the parallax amount can be converted into a defocus amount via a predetermined conversion coefficient. Further, by using an imaging formula of the imaging optical system 101 which will be described later, a defocus amount on an image side can be converted into a distance to an object.

The ranging principle using the imaging plane phase difference method has been described above. In the present embodiment, the distance data generation unit 212 generates distance data from a first image signal and a second image signal by the imaging plane phase difference method.

Next, a detailed operation of the data generation unit 210 will be described with reference to FIG. 5. FIGS. 5A and 5B are flowcharts illustrating operations of the data generation unit according to the embodiment. A CPU, not illustrated in the drawing, which serves as a computer in the virtual viewpoint video generation device 200 executes a computer program stored in a memory which is not illustrated in the drawing to perform operations of steps in the flowcharts of FIGS. 5A and 5B.

First, development processing for generating image data from an image signal which is performed by the development unit 211 of the data generation unit 210 will be described with reference to FIG. 5A. Note that this development processing is executed when the development unit 211 receives an image signal from the imaging element 102.

In step S501, the CPU causes the development unit 211 to perform processing for generating a synthesized image signal in which a first image signal and a second image signal input from the imaging element 102 are synthesized. By synthesizing the first image signal and the second image signal, it is possible to obtain an image signal based on an image formed by a light flux that has passed through the entire exit pupil 401.

When a pixel coordinate in the horizontal direction of the imaging element 102 is assumed to be u, and a pixel coordinate in the horizontal direction of the imaging element 102 is assumed to be v, a synthesized image signal Im(u, v) of a pixel (u, v) can be represented by Formula 1 using a first image signal Im1(u, v) and a second image signal Im2(u, v).

$$Im(u,v)=Im1(u,v)+Im2(u,v) \qquad \text{(Formula 1)}$$

In step S502, the CPU causes the development unit 211 to perform correction processing for a defective pixel in the synthesized image signal. The defective pixel is a pixel for which a normal signal cannot be output in the imaging element 102. First, the development unit 211 acquires information indicating the coordinates of a defective pixel of the imaging element 102 which is recorded in advance in a recording unit which is not illustrated in the drawing. Next, the development unit 211 generates a synthesized image signal of the defective pixel using a median filter that replaces the synthesized image signal with a median value of a synthesized image signal of a pixel around the defective pixel.

The above is an example of the correction processing for a defective pixel performed by the development unit 211. As another correction processing method for a defective pixel, a method of generating a signal value of a defective pixel by performing interpolation using coordinate information of a defective pixel prepared in advance and using signal values of pixels surrounding the defective pixel may be used.

In step S503, the CPU causes the development unit 211 to apply light amount correction processing for correcting a decrease in the amount of light around an angle of view caused by the imaging optical system 101 to a synthesized image signal. As a method of correcting the amount of light, correction can be performed by multiplying a synthesized image signal by a gain value making a relative light amount ratio between angles of view, which is prepared in advance, constant.

For example, the development unit 211 performs light amount correction by multiplying a synthesized image signal of each pixel by a gain having a characteristic of increasing from a central pixel of the imaging element 102 toward peripheral pixels.

In step S504, the CPU causes the development unit 211 to perform noise reduction processing for the synthesized image signal. As a method of reducing noise, for example, Gaussian filtering may be used.

In step S505, the CPU causes the development unit 211 to perform demosaic processing on the synthesized image signal and generate image data having red (R), green (G), and blue (B) color signals and a luminance signal for each pixel. As an example of the demosaic processing, a method of generating color information for each pixel using linear interpolation for each color channel may be used.

In step S506, the CPU causes the development unit 211 to perform gradation correction (gamma correction processing) using a predetermined gamma value. Image data Idc(u, v) of a pixel (u, v) after the gradation correction is represented by Formula 2 by suing image data Id(u, v) of the pixel (u, v) before the gradation correction and a gamma value γ.

$$Idc(u,v)=Id(u,v)^\gamma \qquad \text{(Formula 2)}$$

A value prepared in advance can be used for the gamma value y. The gamma value y may be determined in accordance with the position of a pixel. For example, the gamma value y may be varied for each region obtained by dividing an effective region of the imaging element 102 by a predetermined number of divisions.

The above is the development processing executed by the development unit 211. Note that the development processing is not limited thereto example. For example, the development unit 211 may execute only some of the processes described in steps S501 to S506. Alternatively, the development unit 211 may execute color conversion processing using a color matrix, or the like, and when the processing is necessary for viewing image information output from the imaging element 102, the content of the processing is not limited.

Next, distance data generation processing performed by the distance data generation unit 212 of the data generation unit 210 will be described using FIG. 5B. Note that distance data is data in which each pixel is associated with information corresponding to distance from the imaging units 100A to 100D to a subject.

In step S511, the CPU causes the distance data generation unit 212 to generate a first luminance image signal using a first image signal, and generate a second luminance image signal using a second image signal. At this time, the distance data generation unit 212 generates a luminance image signal by synthesizing image signal values of red, green, and blue pixels of each pixel group 310 by using a predetermined coefficient.

Note that the distance data generation unit 212 may generate a luminance image signal by performing demosaic processing using linear interpolation and then multiplying each of red, green, and blue channels by a predetermined coefficient and synthesizing them.

In step S512, the CPU causes the distance data generation unit 212 to correct a light amount balance between the first luminance image signal and the second luminance image signal. The correction of the light amount balance is executed by multiplying at least one of the first luminance image signal and the second luminance image signal by a correction coefficient.

It is assumed that the correction coefficient is calculated and stored in advance so that a luminance ratio between the first luminance image signal and the second luminance image signal obtained by imaging uniform illumination after adjustment of the positions of the imaging optical system 101 and the imaging element 102 is constant. The distance data generation unit 212 multiplies at least one of the first luminance image signal and the second luminance image signal by a correction coefficient to generate a first image signal and a second image signal that have been subjected to light amount balance correction.

In step S513, the CPU causes the distance data generation unit 212 to perform noise reduction processing on the first luminance image signal and the second luminance image signal to which light amount balance correction is applied. As a specific example of the noise reduction processing, the distance data generation unit 212 may perform processing for applying a low-pass filter that suppresses a band with high spatial frequency to each luminance image signal.

Alternatively, the distance data generation unit 212 may perform processing for applying a band-pass filter that transmits a predetermined spatial frequency band to each luminance image signal. In this case, the effect of reducing the influence of the correction error of the light amount balance correction performed in step S512 can also be obtained.

In step S514, the CPU causes the distance data generation unit 212 to calculate a parallax amount, which is the amount of relative positional deviation between the first luminance image signal and the second luminance image signal. The distance data generation unit 212 sets a point of interest in the first luminance image corresponding to the first luminance image signal, and sets a collation region centering on the point of interest.

Next, the distance data generation unit 212 sets a reference point in the second luminance image corresponding to the second luminance image signal, and sets a reference region centering on the reference point.

The distance data generation unit 212 calculates the degree of correlation between the first luminance image included in the collation region and the second luminance image included in the reference region while sequentially moving the reference point, and sets a reference point with the highest correlation as a correspondence point. The distance data generation unit 212 sets the amount of relative positional deviation between the point of interest and the correspondence point as a parallax amount at the point of interest.

The distance data generation unit 212 can calculate a parallax amount at a plurality of pixel positions by calculating a parallax amount while sequentially moving the point of interest. The distance data generation unit 212 specifies a value indicating a parallax value for each pixel and generates parallax image data, which is data indicating a parallax distribution.

Note that a known method can be used as a method of calculating the degree of correlation used to obtain a parallax amount by the distance data generation unit 212. The distance data generation unit 212 can use, for example, a method called normalized cross-correlation (NCC) for evaluating normalized cross-correlation between luminance images. In addition, the distance data generation unit 212 may use a method of evaluating the degree of difference as the degree of correlation.

The distance data generation unit 212 can use, for example, sum of absolute difference (SAD) for evaluating the sum of absolute values of differences between luminance images. Alternatively, sum of squared difference (SSD) for evaluating the sum of squares of differences can be used.

In step S515, the CPU causes the distance data generation unit 212 to convert a parallax amount of each pixel in parallax image data into a defocus amount, thereby acquiring a defocus amount of each pixel. The distance data generation unit 212 generates defocus image data indicating a defocus amount in each pixel based on the parallax amount of each pixel in the parallax image data.

The distance data generation unit 212 calculates a defocus amount $\Delta L(u, v)$ of a pixel $(u, v)$ from Formula 3 by using a parallax amount $d(u, v)$ and a conversion coefficient $K(u, v)$ of the pixel $(u, v)$ in the parallax image data.

$$\Delta L(u,v)=K(u,v) \times d(u,v) \qquad \text{(Formula 3)}$$

In the imaging optical system 101, a portion of a first light flux 411 and a portion of a second light flux 421 are cut off at a peripheral angle of view due to vignetting. For this reason, the conversion coefficient $K(u, v)$ is a value that depends on an angle of view (the position of a pixel).

Note that, in a case where the imaging optical system 101 has a characteristic of having a curvature of field in which a focal position changes between a central angle of view and a peripheral angle of view, and the amount of curvature of field is $Cf(u, v)$, the parallax amount $d(u, v)$ can be converted into a defocus amount $\Delta L(u, v)$ using Formula 4. Note that the amount of curvature of field $Cf(u, v)$ is a value that depends on an angle of view.

$$\Delta L(u,v)=K(u,v) \times d(u,v) \times Cf(u,v) \qquad \text{(Formula 4)}$$

The conversion coefficient $K(u, v)$ and the amount of curvature of field $Cf(u, v)$ can be calculated by obtaining a relationship between a parallax amount and a distance value to an object by positioning the imaging optical system 101 and the imaging element 102, then imaging and analyzing a predetermined chart, and the like.

In step S516, the CPU causes the distance data generation unit 212 to convert the defocus amount $\Delta L(u, v)$ of the pixel $(u, v)$ into a distance value $D(u, v)$ to the object in the pixel $(u, v)$ to generate distance data. By converting the defocus amount AL using an imaging relationship of the imaging optical system 101, the distance value D to the object can be calculated.

That is, when a focal length of the imaging optical system 101 is f, and a distance from an image-side principal point to the imaging element 102 is Ipp, the defocus amount $\Delta L(u, v)$ can be converted into the distance value $D(u, v)$ to the object by using an imaging formula of Formula 5. In the present embodiment, a distance value $D(u, v)$ for each pixel $(u, v)$ is referred to as distance data.

$$D(u,v)=1/\{1/f^{-1}/(Ipp+\Delta L(u,v))\} \qquad \text{(Formula 5)}$$

Note that, in the description so far, the focal length f and the distance Ipp from the image-side principal point to the imaging element 102 are set to fixed values regardless of an angle of view, but the present invention is not limited thereto. In a case where an imaging magnification of the imaging optical system 101 changes greatly for each angle of view, at least one of the focal length f and the distance Ipp from the principal point to the imaging element 102 may be set to be a value that changes for each angle of view. The above is an example of the distance data generation processing executed by the distance data generation unit 212.

Next, reliability calculation processing of the reliability calculation unit 260 will be described. In the parallax amount calculation processing described in step S514 of FIG. 5B, the distance data generation unit 212 searches for a correspondence point by using a correlation between the first luminance image signal and the second luminance image signal.

Thus, in a case where there is a lot of noise (for example, noise caused by light shot noise) included in the first luminance image signal, or in a case where a change in a signal value of a luminance image signal included in a collation region is small, the degree of correlation may not be evaluated correctly. In such a case, a parallax amount with a large error may be calculated with respect to a correct parallax amount. In a case where a parallax amount has a large error, an error of the distance data generated in step S516 in FIG. 5B is also large.

The reliability calculation unit 260 performs reliability calculation processing for calculating the reliability of a parallax amount (parallax reliability). The parallax reliability is an index indicating how much error is included in the calculated parallax amount. For example, a ratio of a standard deviation to an average value of signal values included in the collation region (hereinafter, referred to as an average value) can be evaluated as a parallax reliability. The standard deviation increases in a case where a change in a signal value (so-called contrast) in the collation region is large. The average value increases in a case where the amount of light incident on a pixel is large.

Note that, in a case where the amount of light incident on a pixel is large, light shot noise increases. That is, the average value has a positive correlation with the amount of noise. As described above, the ratio of the average value to the standard deviation (standard deviation/average value) corresponds to a ratio between the magnitude of contrast and the amount of noise. That is, when the contrast is sufficiently large with respect to the amount of noise, it can be estimated that an error in calculating the parallax amount is small.

In the present embodiment, a ratio of an average value to a standard deviation is defined as a parallax reliability. The greater the parallax reliability, the smaller an error in a calculated parallax amount, and it can be said that it is a more accurate parallax amount. Since a parallax reliability and distance data have a positive correlation, the reliability of the distance data can also be represented by this parallax reliability.

In addition, the reliability calculation unit 260 may calculate the reliability of a parallax amount based on the characteristics of the imaging optical systems 101 of the plurality of imaging units 100A to 100D. The characteristic of the imaging optical system 101 in the present embodiment is a focal length, and the reliability calculation unit 260 determines that the longer a focal length, the higher a reliability. The above is an example of the reliability calculation processing performed by the reliability calculation unit 260.

Figure 6:
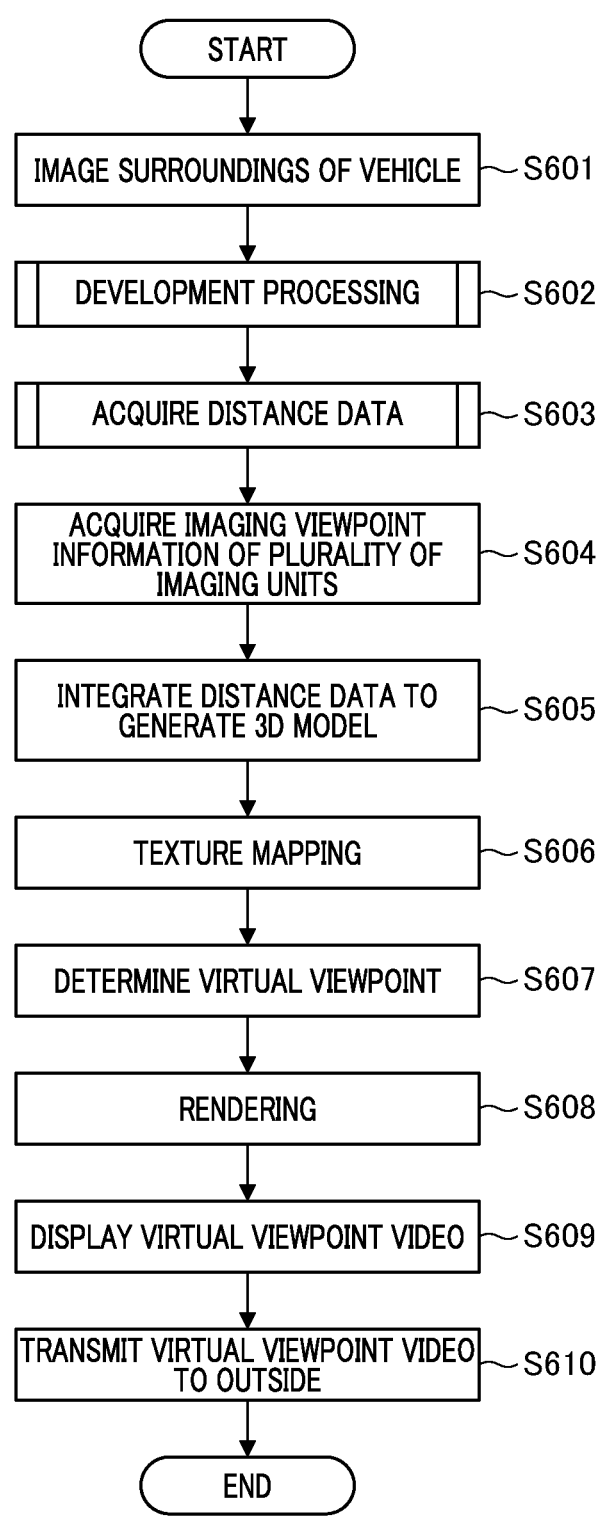
FIG. 6 is a flowchart illustrating operations of a virtual viewpoint video generation device according to the embodiment.

Next, an operation sequence of the virtual viewpoint video generation device 200 will be described with reference to FIG. 6. FIG. 6 is a flowchart illustrating operations of the virtual viewpoint video generation device according to the embodiment. A CPU, not illustrated in the drawing, which serves as a computer in the virtual viewpoint video generation device 200 executes a computer program stored in a memory, which is not illustrated in the drawing, to perform operations of steps in the flowchart of FIG. 6.

In step S601, the CPU causes the plurality of imaging units 100A to 100D installed in the vehicle 100 to capture a video of the surroundings of the vehicle. The imaging elements 102 of the imaging units 100A to 100D output a first image signal based on a signal output from the first photoelectric conversion unit and a second image signal based on a signal output from the second photoelectric conversion unit to the data generation units 210A to 210D, respectively. Here, step S601 functions as an imaging step of acquiring imaging outputs from the plurality of imaging units.

Note that, when the first image signal is output from the first photoelectric conversion unit and then an image signal is output from the second photoelectric conversion unit, the first image signal and the second image signal may be added (combined) and output. Then, the second image signal may be acquired by subtracting the first image signal from the synthesized output later.

In step S602, the CPU causes the development units 211 of the data generation units 210A to 210D to perform development processing on the first image signals and the second image signals output from the imaging units 100A to 100D to perform image data thereof. Here, step S602 functions as a development step of generating a plurality of pieces of image data based on the imaging outputs of the plurality of imaging units. The development unit 211 outputs each image data to the texture mapping unit 222 and the reliability calculation unit 260.

In step S603, the CPU causes the distance data generation units 212 of the data generation units 210A to 210D to perform distance data generation processing by using the first image signal and the second image signal output from the imaging units 100A to 100D.

Here, step S603 functions as a distance data generation step of generating distance data for each pixel of a plurality of pieces of image data based on the first image signals and the second image signals generated by each of the plurality of imaging units. The distance data generation unit 212 outputs the distance data to the 3D model generation unit 221 and the reliability calculation unit 260.

In step S604, the CPU causes the 3D model generation unit 221 and the texture mapping unit 222 to acquire information on the positions and postures of the plurality of imaging units 100A to 100D (hereinafter referred to as imaging viewpoint information).

In the present embodiment, the imaging viewpoint information includes position and posture information of the imaging units 100A to 100D within a predetermined coordinate system, and includes, for example, positional information of the imaging device and posture information of the imaging device indicating an optical axis direction.

In addition, the imaging viewpoint information can also include angle-of-view information of the imaging device, such as a focal length or a principal point position of the imaging device. Based on the imaging viewpoint information, each pixel of imaging data can be associated with the position of a subject in the imaging data using a known method.

Note that, in the coordinate system in the present embodiment, the vertical direction of the vehicle 100 is defined as an x-axis, the horizontal direction is defined as a y-axis, and the height direction is defined as a z-axis, as illustrated in FIG. 1, and the origin of the coordinate system is set to be a point which is the center of the vehicle and the ground surface when viewed along the z-axis.

In addition, it is assumed that the coordinate system is a right-handed coordinate system, a traveling direction of a vehicle 901 is the positive direction of the x-axis, the left side of the vehicle 901 is the positive direction of the y-axis, and a direction toward the sky is the positive direction of the z-axis. Hereinafter, the coordinate system mentioned above will be referred to as a world coordinate system. However, the coordinate system and the position of the origin are not limited thereto, and any coordinate system may be set.

In step S605, the CPU causes the 3D model generation unit 221 to integrate a plurality of pieces of distance data corresponding to angles of view of the imaging units 100A to 100D, which are output from the distance data generation unit 212, to generate a 3D model of the surroundings of a vehicle 100. Here, each of the plurality of pieces of distance data represents a distance to a subject from each of the imaging units 100A to 100D.

The 3D model generation unit 221 uses distance data obtained by converting the plurality of pieces of distance data into a distance from the origin of the world coordinate system (hereinafter referred to as world coordinate system distance data) to generate a 3D model by using the imaging viewpoint information of the imaging units 100A to 100D acquired in step S604.

In addition, the 3D model generation unit 221 can generate a 3D model in consideration of occlusion of each of the plurality of imaging units 100A to 100D in an overlapping imaging region of the plurality of imaging units 100A to 100D (an overlapping imaging region between two adjacent imaging units in this example). This processing will be described with reference to FIG. 7.

Figure 7A:
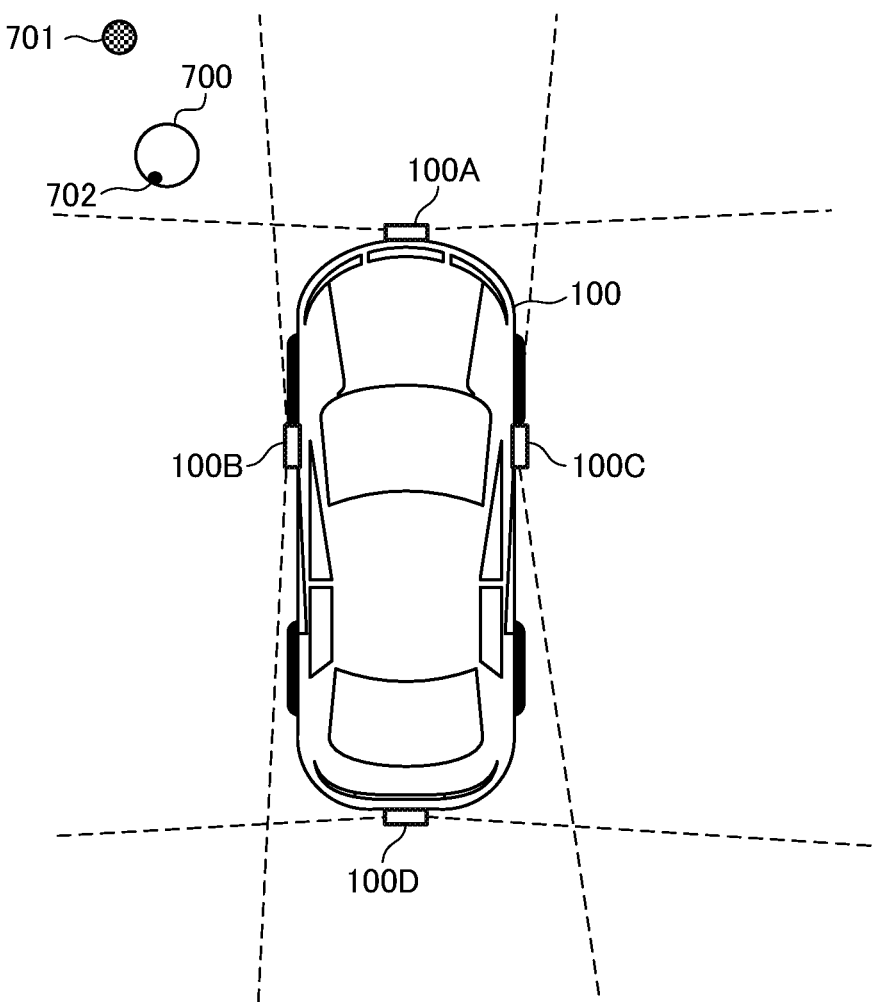
FIGS. 7A and 7B are diagrams illustrating positional relationships between imaging units and three-dimensional objects around a vehicle.
Figure 7B:
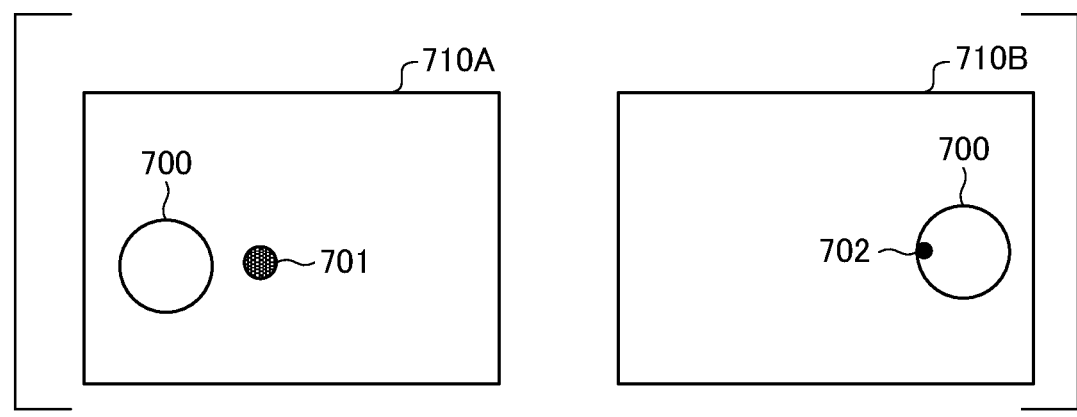

FIGS. 7A and 7B are diagrams illustrating a positional relationship between the imaging units and three-dimensional objects around the vehicle, and FIG. 7A is a diagram illustrating a positional relationship between the imaging units 100A to 100D installed in the vehicle 100 and three-dimensional objects around the vehicle (a sphere 700 and a sphere 701 in this example). FIG. 7B is a diagram illustrating an angle of view 710A of the imaging unit 100A and an angle of view 710B of the imaging unit 100B at this time.

The imaging units 100A and 100B have an overlapping imaging region, but the three-dimensional objects (the sphere 700 and the sphere 701) in the overlapping imaging region are not equally included in both the angle of view 710A of the imaging unit 100A and the angle of view 710B of the imaging unit 100B. In this example, the sphere 701 is included in the angle of view 710A of the imaging unit 100A, but is not included in the angle of view 710B because it is an occlusion region blocked by the sphere 700 when viewed from the imaging unit 100B.

For this reason, the 3D model generation unit 221 creates a 3D model representing the sphere 701 based on world coordinate system distance data corresponding to the angle of view of the imaging unit 100A. Similarly, a black dot region 702 of the sphere 700 is included in the angle of view 710B of the imaging unit 100B, but is not included in the angle of view 710A of the imaging unit 100A because it is an occlusion region blocked by the sphere 700 when viewed from the imaging unit 100A.

Thus, in the 3D model representing the sphere 700, the 3D model of the occlusion region of the imaging unit 100A is created by the 3D model generation unit 221 based on the world coordinate system distance data corresponding to the imaging unit 100B. Similarly, the 3D model of the occlusion region of the imaging unit 100B is generated by the 3D model generation unit 221 based on the world coordinate system distance data corresponding to the imaging unit 100A.

As described above, the 3D model generation unit 221 determines occlusion regions of the plurality of imaging units based on the distance data in the overlapping imaging regions of the plurality of imaging units, and determines distance data for generating a 3D model based on the determination result.

Note that the determination of whether or not occlusion has occurred in the angles of view of the plurality of imaging units 100A to 100D may be determined according to, for example, whether a difference between the pieces of world coordinate system distance data corresponding to the imaging units 100A and 100B in an overlapping imaging region is equal to or greater than a predetermined value. When the distance data is equal to or greater than a certain value, it is determined that occlusion has occurred.

Alternatively, the determination may be performed according to whether or not a difference between pixel values of the image data of the imaging units 100A and 100B is equal to or greater than a certain value. In a case where the difference between the pixel values is equal to or greater than a certain value, it can be determined that different subjects are being imaged, and thus it is determined that occlusion has occurred.

The above is the 3D model generation method in step S605 performed by the 3D model generation unit 221 and taking occlusion into consideration.

Note that the 3D model generation unit 221 does not cause the above-described occlusion in the angle of view of each of the imaging units 100A to 100D in the overlapping imaging region. Thus, a 3D model may be created using the reliability calculated by the reliability calculation unit 260 for regions imaged by the plurality of imaging units 100A to 100D.

As a specific example in that case, a method of generating a 3D model in the overlapping imaging regions between the imaging units 100A and 100B will be described. The 3D model generation unit 221 selects world coordinate system distance data with a high reliability calculated by the reliability calculation unit 260 out of two pieces of world coordinate system distance data corresponding to the imaging units 100A and 100B in the overlapping imaging region and creates a 3D model.

That is, the 3D model generation unit 221 determines distance data to be used for 3D model generation based on a reliability.

This reliability may be a value obtained from the characteristics of the imaging optical system 101 as described above. That is, the reliability of the distance data may be determined based on the characteristics of the optical system of the imaging unit. For example, it is assumed that the focal lengths f of the imaging optical systems 101 of the imaging units 100A and 100B are different from each other.

In this case, the reliability calculation unit 260 determines that data imaged by the imaging optical system with the longer focal length f has a higher reliability. That is, the characteristics of the optical system used for the determination of reliability include a focal length. For this reason, the 3D model generation unit 221 generates a 3D model based on the world coordinate system distance data corresponding to the imaging unit having the longer focal length fin the overlapping imaging region.

As another example, a case where the imaging optical systems 101 of the imaging units 100A and 100B both have the characteristics that an imaging magnification changes greatly depending on an angle of view, and the focal length f changes for each angle of view will be described. The characteristics of the imaging optical system 101 include, for example, an optical characteristic in which a magnification is high at the center of the angle of view, and a magnification decreases toward the periphery of the angle of view, and an optical characteristic in which a focal length becomes shorter toward the periphery of the angle of view.

In this case, the closer to the center of the angle of view, the higher the reliability calculated by the reliability calculation unit 260. For this reason, the 3D model generation unit 221 may generate a 3D model using the world coordinate system distance data in which the same subject is more centered in the angle of view, out of the two pieces of world coordinate system distance data.

Note that the 3D model generation unit 221 may correct a distance value of a region with a low reliability of the distance data based on an analysis result of image data. An example of such correction processing will be described with reference to FIG. 8.

Figure 8A:
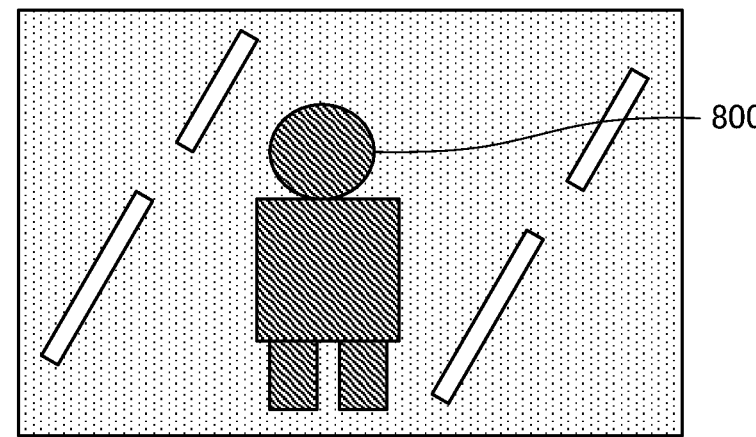
FIGS. 8A to 8C are diagrams illustrating an example of distance data correction processing performed by a 3D model generation unit.
Figure 8B:
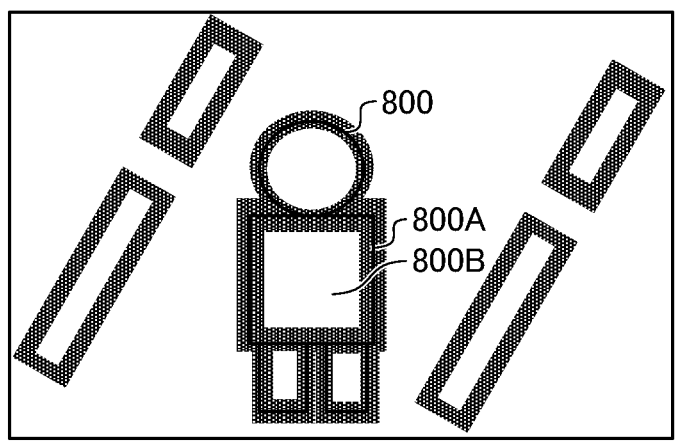
Figure 8C:
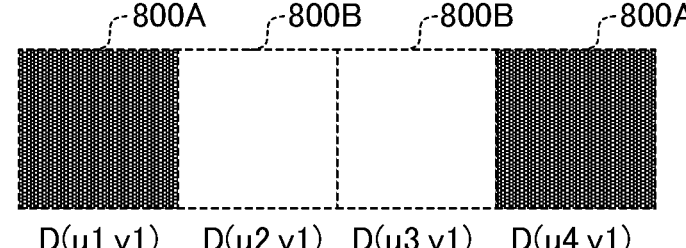

FIGS. 8A to 8C are diagrams illustrating an example of distance data correction processing performed by the 3D model generation unit. FIG. 8A illustrates an image of a result obtained by performing region division processing such as instance segmentation on image data by the 3D model generation unit 221.

Regions having the same pattern in FIG. 8A represent regions determined to be the same object region by the region division processing. Through such region division processing, it is possible to obtain an analysis result indicating that a region 800 in the image data is the region of the same object (a person in this example). The following description will focus on the region 800.

FIG. 8B is a diagram illustrating the reliability of distance data calculated by the reliability calculation unit 260. In this example, patterned regions in the drawing represent regions with a reliability equal to or greater than a predetermined value, and a non-patterned region represents a region with a reliability less than the predetermined value.

In other words, FIG. 8B shows that the reliability of distance data of a region 800A corresponding to a contour portion in the distance data of the region 800 of the person is equal to or greater than the predetermined value, and the reliability of distance data of a region 800B which is not the contour is less than the predetermined value.

Figures 5A, 5B:
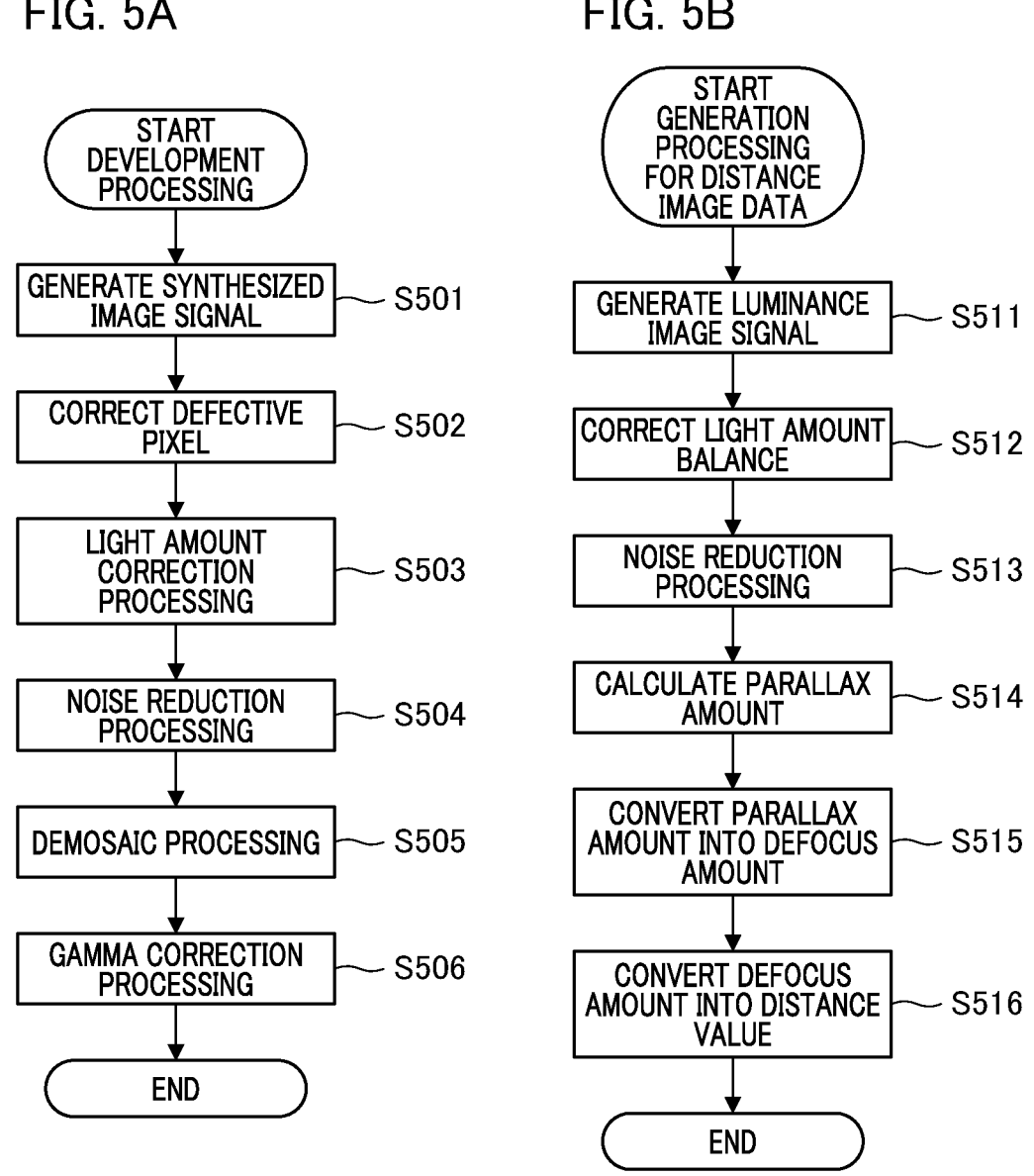
FIGS. 5A and 5B are flowcharts illustrating operations of a data generation unit according to the embodiment.

This is because an error at the time of calculating a parallax amount in FIG. 5B becomes larger in a region without a contour or a region with a low contrast. In this manner, in the example of FIG. 8B, the reliability is determined based on the contrast of image data corresponding to the distance data.

Note that, in FIG. 8B, the contour of the region 800 of the person illustrated in FIG. 8A is indicated by a solid line. The 3D model generation unit 221 corrects the distance data of the region 800B of which the reliability is less than the predetermined value based on the distance data of the region 800A of which the reliability is equal to or greater than the predetermined value in the region 800 of the same object. An example of this correction will be described with reference to FIG. 8C.

FIG. 8C is an enlarged view of a portion of the distance data of the region 800 of the person in FIG. 8B, and D(u1, v1) and D(u4, v1) are distance data belonging to the region 800A and have a reliability of equal to or greater than a predetermined value. In addition, D(u2, v1) and D(u3, v1) are distance data belonging to the region 800B and have a reliability of less than the predetermined value.

Here, correction processing performed by the 3D model generation unit 221 for the distance values D(u2, v1) and D(u3, v1) of which the reliability is less than the predetermined value will be described.

First, the 3D model generation unit 221 determines in which region D(u2, v1) and D(u3, v1) are included, with reference to a region division processing result. In this example, D(u2, v1) and D(u3, v1) are determined to be included in the region 800 of the person.

Next, the 3D model generation unit 221 specifies distance data of which the reliability is equal to or greater than the predetermined value, the distance data being present in the vicinity of D(u2, v1) and D(u3, v1) among the pieces of distance data included in the person's region. In this example, D(u1, v1) and D(u4, v1) are specified.

Next, the 3D model generation unit 221 performs linear interpolation of the distance data of D(u2, v1) and D(u3, v1) using distance values D(u1, v1) and D(u4, v1) that are in the region 800A and have a reliability of equal to or greater than the predetermined value in the region 800 of the same person, and replaces it with the result. That is, the 3D model generation unit 221 corrects distance data of a predetermined region of an object of which the reliability is determined to be less than the predetermined value, based on the distance data of the region of the same object of which the reliability is equal to or greater than the predetermined value.

The above is an example in which the 3D model generation unit 221 corrects distance data of a predetermined object region having a low reliability using distance data to the same object region having a high reliability using distance based on an analysis result of image data. The 3D model generation unit 221 performs 3D model generation processing using the corrected distance data. Note that a method of the correction processing is not limited thereto.

As another example, the 3D model generation unit 221 determines whether distance data with a low reliability in a predetermined object region is within a range between equal to or greater than a lower limit value and equal to or less than an upper limit value of distance data with a high reliability in the same surrounding object region. When the distance data falls outside the range, the 3D model generation unit 221 may replace the distance data with a low reliability with a value within the range.

Note that, generally, in ranging using a parallax image, a parallax almost disappears when a ranging target is far away, and thus the accuracy of ranging varies. For this reason, the 3D model generation unit 221 may create a 3D model using another 3D model recorded in advance in a recording unit, which is not illustrated in the drawing, for an area that is at least a predetermined distance away from the vehicle 100.

Figure 9:
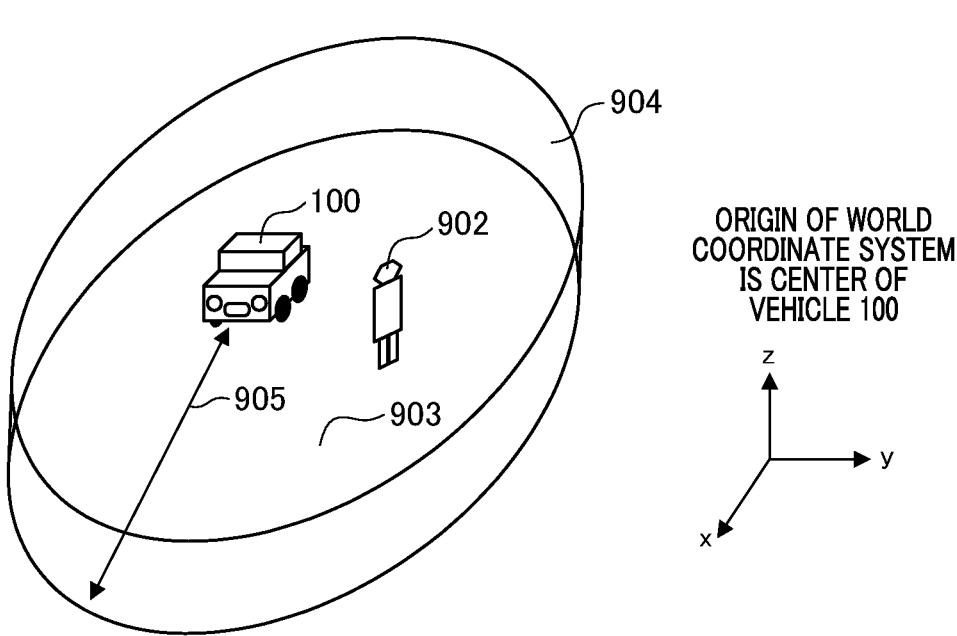
FIG. 9 is a diagram illustrating an example of a 3D model generated by the 3D model generation unit.

This processing will be described using FIG. 9. FIG. 9 is a diagram illustrating an example of a 3D model generated by the 3D model generation unit 221. A three-dimensional object model 902 is a 3D model representing a three-dimensional object (a person in this example) that is present around the vehicle 100. A ground surface model 903 is a 3D model representing the ground surface of the vehicle 100.

A curved surface model 904 is a 3D model that extends from the plane of the ground surface model 903 in the positive direction of the z-axis of the world coordinate system and surrounds the vehicle 100. The 3D model generation unit 221 generates a 3D model constituted by the three-dimensional object model 902 around the vehicle, the ground surface model 903 representing a road surface on which the vehicle is present, and the curved surface model 904, as illustrated in FIG. 9.

Both the three-dimensional object model 902 and the ground surface model 903 that are present within a predetermined distance 905 from the vehicle 100 are created by the 3D model generation unit 221 based on the world coordinate system distance data. On the other hand, the curved surface model 904 is a model that is recorded in advance in a recording unit which is not illustrated in the drawing.

A distance 905 from the vehicle 100 to a starting point of the curved surface model 904 may be determined in advance based on the characteristics of the imaging optical systems 101 of the imaging units 100A to 100D. Alternatively, in a case where the 3D model generation unit 221 determines that an average value of the reliability of data representing a distance of a certain value or greater in the world coordinate system distance data is lower than a predetermined value, the distance may be set as the distance 905 to the starting point of the curved surface model 904.

The curved surface model 904 is not limited to the model described above, and may be any 3D model that has a length in the z-axis direction of the world coordinate system, that is, has a height. The reason for defining a 3D model having a height is to suppress distortion and falling on a virtual viewpoint video for three-dimensional objects such as a person or a building that is present farther than the distance 905 from the vehicle 100. Note that another example of the 3D model may be a bowl-shaped spherical model.

An example in which the 3D model generation unit 221 performs 3D model generation processing for an area that is at least a certain distance away from the vehicle has been described above. Through the processing as in the present embodiment, it is possible to suppress unnatural distortion of the shape of an area of the 3D model which is a predetermined distance or more away from the vehicle 100 in which the accuracy of the world coordinate system distance data is likely to vary.

A specific example of the 3D model generation processing performed by the 3D model generation unit 221 in the present embodiment has been described above. The 3D model generation unit 221 outputs the generated 3D model to the texture mapping unit 222.

Returning back to FIG. 6, in step S606, the CPU causes the texture mapping unit 222 to perform texture mapping processing based on the image data and imaging viewpoint information acquired from the development unit 211 and the 3D model acquired from the 3D model generation unit 221.

The texture mapping processing is processing for generating a textured 3D model by positionally associating the 3D model and the image data with each other. The texture mapping processing will be described below.

The texture mapping unit 222 uses the image data received from the development unit 211 as a texture image for texture mapping. As a specific example, the texture mapping unit 222 determines a pixel value of image data corresponding to distance data used to generate a 3D model as a texture of the corresponding portion of the 3D model.

Further, in overlapping imaging regions of the imaging units 100A to 100D, when a 3D model is generated by averaging a plurality of pieces of distance data, pixel values of the corresponding plurality of pieces of image data may be blended and determined as textures.

In addition, the texture mapping unit 222 may determine pixel values of textures to be applied to occlusion regions that are not included in all of the angles of view of the imaging units 101A to 101D in advance. In the present embodiment, the texture of the occlusion region is determined as black (r, g, b)=(0, 0, 0), that is, a texture with zero R, G, and B signals. Note that pixels prepared for the occlusion region may be pixels other than black, and in this case, pixel values to be set may be set as pixel values of desired colors.

A texture-mapped 3D model is generated by performing the above processing on all pixels of a 3D model. However, the texture mapping processing described above is merely an example, and any method capable of mapping textures from multi-viewpoint image data to a 3D model may be used.

For example, in a case where the curved surface model 904 described above is constituted by an aggregate of triangular polygons, the texture mapping unit 222 may perform texture mapping by associating the vertices of each polygon with textures using a known method.

The texture mapping unit 222 outputs the texture-mapped 3D model to the rendering unit 223.

In step S607, the CPU causes the virtual viewpoint determination unit 231 to determine virtual viewpoint information based on information received from the communication unit 230 and outputs the determined virtual viewpoint information to the rendering unit 223.

The virtual viewpoint information includes positional information of a virtual viewpoint within a predetermined coordinate system, and for example, includes the positional information of the virtual viewpoint and posture information indicating an optical axis direction, similar to the imaging viewpoint information. Furthermore, the virtual viewpoint information can also include angle-of-view information from the virtual viewpoint, resolution information of a virtual viewpoint image, and the like. Further, the virtual viewpoint information can also include distortion parameters, imaging parameters, and the like. In the present embodiment, the predetermined coordinate system is the same as the world coordinate system described above.

In addition, the information received from the communication unit 230 may be, for example, information for giving an instruction for a virtual viewpoint, which is input by an occupant of the vehicle 100 via an operation unit such as a remote controller or a touch panel display which is not illustrated in the drawing. In this case, the virtual viewpoint determination unit 231 determines virtual viewpoint information in response to the instruction.

Another example of the information received from the communication unit 230 may be information regarding a change in the traveling direction of the vehicle 100, such as control information for turn signals of the vehicle 100. In this case, the virtual viewpoint determination unit 231 determines virtual viewpoint information according to the traveling direction.

In step S608, the CPU causes the rendering unit 223 to perform rendering processing on the textured 3D model acquired from the texture mapping unit 222 based on the virtual viewpoint information acquired from the virtual viewpoint determination unit 231 to thereby generate a virtual viewpoint video. Through this rendering processing, a video in which the textured 3D model is viewed from a virtual viewpoint position is generated.

Note that a method of rendering the video in which the textured 3D model is viewed from the virtual viewpoint position is well known, and any method can be used, and thus the description thereof will be omitted. The rendering unit 223 outputs the rendered virtual viewpoint image to the video transmission unit 240 and the display unit 250.

In step S609, the CPU causes the display unit 250 to display the received virtual viewpoint video, and in step S610, the CPU causes the video transmission unit 240 to transmit the received virtual viewpoint video to the outside of the vehicle 100.

Here, steps S605 to S609 function as video generation steps of generating a virtual viewpoint video viewed from a predetermined virtual viewpoint based on a plurality of pieces of image data and distance data for each pixel of the plurality of pieces of image data.

Note that, in the present embodiment, in step S605, the 3D model generation unit 221 uses a 3D model by using all pieces of distance data input to itself. All of the pieces of distance data in the present embodiment are imaging data of the imaging units 100A to 100D obtained from the distance data generation unit 212, and are distance data of the entire periphery of the vehicle 100.

In the present embodiment, by recording the 3D model of the entire periphery of the vehicle 100 generated in this manner, it is possible to confirm the surroundings of the vehicle 100 by changing a virtual viewpoint at any time. Thus, even when the vehicle 100 is not driven, a virtual viewpoint video of the surroundings of the vehicle 100 can be confirmed, and the function of a drive recorder or the like can be improved.

However, when the 3D model is generated, the 3D model generation unit 221 may generate the 3D model using only distance data necessary to generate a virtual viewpoint video by using virtual viewpoint information obtained from the virtual viewpoint determination unit 231. For example, in a case where the virtual viewpoint information indicates a left front region of the vehicle 100, the 3D model generation unit 221 may generate the 3D model using only distance data obtained based on image information of the imaging units 100A and 100B to generate a virtual viewpoint.

That is, the 3D model generation unit 221 may select distance data to be used to generate the 3D model from among a plurality of pieces of distance data based on the position of the virtual viewpoint. Thereby, it is possible to reduce a processing load of a virtual viewpoint video by the display video generation unit 220, which is suitable for viewing a virtual viewpoint video around the vehicle 100 in real time, such as parking assistance and remote control.

As described above, according to the virtual viewpoint video generation device 200 in the present embodiment, it is possible to reduce positional and temporal deviations between a 3D model and a texture. Furthermore, it is possible to realize a virtual viewpoint video with high reproducibility of the shape of an object with a device configuration smaller than in the related art.

Note that, in the above-described embodiment, an example in which the virtual viewpoint video generation device 200 as an image processing device is installed in a moving apparatus such as the vehicle 100 has been described. However, the moving apparatus in the present embodiment is not limited to vehicles such as automobiles, and may be any moving apparatus that moves, such as trains, ships, airplanes, robots, and drones.

In addition, the image processing device of the present embodiment includes those installed in those moving apparatuses. Note that the virtual viewpoint video generation device 200 as an image processing device of the present embodiment includes an external device that is disposed at a position away from the moving apparatus and remotely controls the moving apparatus.

Note that, for example, an example in which an imaging element constituted by one image sensor of an imaging plane phase difference method (imaging plane phase difference ranging method or imaging plane phase difference detection method) is used has been described in the above-described embodiment, but the imaging element may be a stereo camera constituted by two image sensors. That is, an optical system and an imaging element that generates a first image signal and a second image signal having a predetermined parallax from an optical image incident through the optical system may include one or two image sensors.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the image processing device through a network or various storage media. Then, a computer (or a CPU, an MPU, or the like) of the image processing device may be configured to read and execute the program. In such a case, the program and the storage medium storing the program configure the present invention.

This application claims the benefit of Japanese Patent Application No. 2022-083849, filed on May 23, 2022, which is hereby incorporated by reference herein in its entirety.

What is claimed is:

1. An image processing device comprising:
a plurality of imaging units each configured to include an optical system and an imaging element including a first photoelectric conversion unit and a second photoelectric conversion unit each of which generates a first image signal and a second image signal having a predetermined parallax from an optical image incident through the optical system;
at least one memory storing instructions; and
at least one processor or circuit capable of executing the instructions, the at least one processor or circuit configured to:
generate a plurality of pieces of image data based on outputs of the plurality of imaging units,
generate distance data for each pixel of the plurality of pieces of image data using an imaging plane phase difference method based on the first image signal and the second image signal generated by the first photoelectric conversion unit and the second photoelectric conversion unit of each of the plurality of imaging units,
generate a virtual viewpoint video viewed from a predetermined virtual viewpoint based on the plurality of pieces of image data and the distance data for each pixel of the plurality of pieces of image data,
generate a 3D model based on the distance data,
generate a textured 3D model by mapping the image data onto the 3D model,
generate a virtual viewpoint video based on an image of the textured 3D model viewed from the virtual viewpoint,
determine a reliability of the distance data based on characteristics of the optical system of the imaging unit,
determine the distance data to be used for 3D model generation based on the reliability and a result obtained by determining occlusion regions of the plurality of imaging units based on differences between distance data of the plurality of imaging units in an overlapping imaging region between the plurality of imaging units, and
perform region-division processing on at least one of the plurality of pieces of image data to obtain an object region, and, when the reliability of distance data of a predetermined region of the object is less than a predetermined value, correct the distance data of the predetermined region based on distance data of a region of the same object in which the reliability is equal to or greater than the predetermined value, the correction including linear interpolation using the distance data of the region having the reliability equal to or greater than the predetermined value.

2. The image processing device according to claim 1, wherein the plurality of imaging units are disposed apart from each other to image the surroundings of a moving apparatus, and the at least one processor or circuit is configured to create the virtual viewpoint video of the surroundings of the moving apparatus.

3. The image processing device according to claim 1, wherein the characteristics of the optical system include a focal length.

4. The image processing device according to claim 1, wherein the at least one processor or circuit is configured to determine the reliability based on a contrast of the image data corresponding to the distance data.

5. The image processing device according to claim 1, wherein the at least one processor or circuit is configured to select the distance data to be used for 3D model generation from among the plurality of pieces of distance data based on the position of the virtual viewpoint.

6. The image processing device according to claim 1, wherein the imaging element includes one or two image sensors.

7. A moving apparatus comprising:

a plurality of imaging units each configured to include an optical system and an imaging element including a first photoelectric conversion unit and a second photoelectric conversion unit each of which generates a first image signal and a second image signal having a predetermined parallax from an optical image incident through the optical system;

at least one memory storing instructions; and at least one processor or circuit capable of executing the instructions, the at least one processor or circuit configured to:

generate a plurality of pieces of image data based on outputs of the plurality of imaging units, generate distance data for each pixel of the plurality of pieces of image data using an imaging plane phase difference method based on the first image signal and the second image signal generated by the first photoelectric conversion unit and the second photoelectric conversion unit of each of the plurality of imaging units, generate a virtual viewpoint video viewed from a predetermined virtual viewpoint based on the plurality of pieces of image data and the distance data for each pixel of the plurality of pieces of image data, generate a 3D model based on the distance data, generate a textured 3D model by mapping the image data onto the 3D model, generate a virtual viewpoint video based on an image of the textured 3D model viewed from the virtual viewpoint, determine a reliability of the distance data based on characteristics of the optical system of the imaging unit, determine the distance data to be used for 3D model generation based on the reliability and a result obtained by determining occlusion regions of the plurality of imaging units based on differences between distance data of the plurality of imaging units in an overlapping imaging region between the plurality of imaging units, perform region-division processing on at least one of the plurality of pieces of image data to obtain an object region, and, when the reliability of distance data of a predetermined region of the object is less than a predetermined value, correct the distance data of the predetermined region based on distance data of a region of the same object in which the reliability is equal to or greater than the predetermined value, the correction including linear interpolation using the distance data of the region having the reliability equal to or greater than the predetermined value, and display the virtual viewpoint video.

8. An imaging processing method comprising:

acquiring imaging outputs from a plurality of imaging units each configured to include an optical system and an imaging element including a first photoelectric conversion unit and a second photoelectric conversion unit each of which generates a first image signal and a second image signal having a predetermined parallax from an optical image incident through the optical system;

generating a plurality of pieces of image data based on the imaging outputs of the plurality of imaging units;

generating distance data for each pixel of the plurality of pieces of image data using an imaging plane phase difference method based on the first image signal and the second image signal generated by the first photoelectric conversion unit and the second photoelectric conversion unit each of the plurality of imaging units;

generating a virtual viewpoint video viewed from a predetermined virtual viewpoint based on the plurality of pieces of image data and the distance data for each pixel of the plurality of pieces of image data;

generating a 3D model based on the distance data;

generating a textured 3D model by mapping the image data onto the 3D model;

generating a virtual viewpoint video based on an image of the textured 3D model viewed from the virtual viewpoint;

determining a reliability of the distance data based on characteristics of the optical system of the imaging unit;

determining the distance data to be used for 3D model generation based on the reliability and a result obtained by determining occlusion regions of the plurality of imaging units based on differences between distance data of the plurality of imaging units in an overlapping imaging region between the plurality of imaging units; and performing region-division processing on at least one of the plurality of pieces of image data to obtain an object region, and, when the reliability of distance data of a predetermined region of the object is less than a predetermined value, correcting the distance data of the predetermined region based on distance data of a region of the same object in which the reliability is equal to or greater than the predetermined value, the correction including linear interpolation using the distance data of the region having the reliability equal to or greater than the predetermined value.

9. A non-transitory computer-readable storage medium configured to store a computer program comprising instructions for executing following processes:

acquiring imaging outputs from a plurality of imaging units each configured to include an optical system and an imaging element including a first photoelectric conversion unit and a second photoelectric conversion unit each of which generates a first image signal and a second image signal having a predetermined parallax from an optical image incident through the optical system;

generating a plurality of pieces of image data based on the imaging outputs of the plurality of imaging units;

generating distance data for each pixel of the plurality of pieces of image data using an imaging plane phase difference method based on the first image signal and the second image signal generated by the first photoelectric conversion unit and the second photoelectric conversion unit of each of the plurality of imaging units;

generating a virtual viewpoint video viewed from a predetermined virtual viewpoint based on the plurality of pieces of image data and the distance data for each pixel of the plurality of pieces of image data;

generating a 3D model based on the distance data;

generating a textured 3D model by mapping the image data onto the 3D model;

generating a virtual viewpoint video based on an image of the textured 3D model viewed from the virtual viewpoint;

determining a reliability of the distance data based on characteristics of the optical system of the imaging unit;

determining the distance data to be used for 3D model generation based on the reliability and a result obtained by determining occlusion regions of the plurality of imaging units based on differences between distance data of the plurality of imaging units in an overlapping imaging region between the plurality of imaging units; and performing region-division processing on at least one of the plurality of pieces of image data to obtain an object region, and, when the reliability of distance data of a predetermined region of the object is less than a predetermined value, correcting the distance data of the predetermined region based on distance data of a region of the same object in which the reliability is equal to or greater than the predetermined value, the correction including linear interpolation using the distance data of the region having the reliability equal to or greater than the predetermined value.

* * * * *